United States Patent [19]

Walker et al.

[11] 4,258,416
[45] Mar. 24, 1981

[54] INVERTER POWER CONVERSION SYSTEM HAVING IMPROVED CONTROL SCHEME

[75] Inventors: Loren H. Walker, Salem; John H. Cutler, Roanoke, both of Va.

[73] Assignee: General Electric Company, Salem, Va.

[21] Appl. No.: 32,895

[22] Filed: Apr. 24, 1979

[51] Int. Cl.³ .................... H02M 7/515; H02M 7/757
[52] U.S. Cl. .................................... 363/137; 307/269; 328/62; 318/722; 318/345 G
[58] Field of Search .................... 307/228, 269, 356; 328/62, 72, 74; 318/344, 345 G, 722, 739, 756, 801-803, 807, 810-812; 363/96, 135-138

[56] References Cited

U.S. PATENT DOCUMENTS 4,191,998  3/1980  Carmody .................... 307/269 X

*Primary Examiner*—William M. Shoop
*Attorney, Agent, or Firm*—Arnold E. Renner

[57] ABSTRACT

A polyphase inverter system for supplying alternating current power to a load through the use of conduction controlled devices such as controlled rectifiers which are selectively rendered conductive in a sequence and at a rate which determines the frequency of the electrical power delivered to the load, includes an inverter control employing a source of pulses and an open-ended bidirectional shift register. The contents of the register are shifted in response to the application thereto of the pulses, in combination with a direction signal. The instantaneous contents of the register serve to initiate gating signals for rendering conductive the controlled rectifiers. Logic means associated with and responsive to a specified configuration of the register contents develop, in combination with the directional signal, a predetermined bit pattern to be inserted into the register.

15 Claims, 5 Drawing Figures

TABLE 1

| REGISTER | THYRISTOR |
|---|---|
| $Q_1$ | $P_1$ |
| $Q_2$ | $N_3$ |
| $Q_3$ | $P_2$ |
| $Q_4$ | $N_1$ |
| $Q_5$ | $P_3$ |
| $Q_6$ | $N_2$ |

POSITIVE SEQUENCE (downward) | NEGATIVE SEQUENCE (upward)

PRIOR ART

FIG. 4

TABLE 2

| REGISTER | THYRISTORS |
|---|---|
| $Q_1$ | $P_1$ & $N_2$ |
| $Q_2$ | $P_1$ & $N_3$ |
| $Q_3$ | $P_2$ & $N_3$ |
| $Q_4$ | $P_2$ & $N_1$ |
| $Q_5$ | $P_3$ & $N_1$ |
| $Q_6$ | $P_3$ & $N_2$ |

POSITIVE SEQUENCE (downward) | NEGATIVE SEQUENCE (upward)

FIG. 5

INVERTER POWER CONVERSION SYSTEM HAVING IMPROVED CONTROL SCHEME

BACKGROUND OF THE INVENTION

The present invention relates generally to electric power converter systems of the inverter type and more particularly to inverter systems having improved self-correcting control means.

It has been known for many years to provide variable power and frequency alternating current (a.c.) to a load through the use of an arrangement of conduction controlled devices. Originally, the devices employed in such arrangements were usually gas tube devices such as thyratrons but it is now much more common to use semi-conductor devices of the gate controlled type which are generically known as thyristors, the most common form of which is the silicon controlled rectifier. For convenience and purposes of this description, the term conduction controlled device will be used generally as a generic term while the term thyristor will be employed in the illustrated embodiment.

In one of the more common three phase versions of an inverter bridge, variable direct current (d.c.) power is applied to a six thyristor bridge having a pair of series connected thyristors associated with each leg of the three phase output. An inverter control supplies gate pulses to gate the thyristors on at the desired frequency for the inverter output. One very common control which is discussed in some detail in the detailed description which follows includes an oscillator which outputs pulses at a frequency six times that desired for the output of the thyristor (one pulse per thyristor per cycle). These pulses are applied to a recirculating shift register having six bit positions. The shift register is preloaded with a specific content and the contents of the register are shifted one bit position with the application of each pulse. The direction of shifting is determined by some form of control signal signifying whether the inverter is to run in the forward or reverse mode. In this prior art system, gating pulses are generated as a function of the instantaneous content of the register bit positions; e.g., if binary 1's are in bit positions 3 and 4, gate signals are initiated which are applied to the thyristors associated with those two bit positions to thus render those thyristors conductive.

Such systems are generally satisfactory but they do suffer from some major difficulties. First of all, the extra circuitry required to provide the parallel loading of the recirculating shift register adds expense. More importantly, however, if the bit pattern within the shift register is disturbed for any reason, such as spurious noise or transients within the system, then the bridge ceases to function properly and it is necessary to shut down the system and reload the shift register to reinitiate proper bridge operation. This problem will be discussed in greater detail in the detailed description which follows.

SUMMARY OF THE INVENTION

It is, therefore, an object of the present invention to provide an improved polyphase inverter system.

It is another object to provide an inverter system which includes a self-correcting, bidirectional shift register for initiating gating pulses.

Still another object is to provide a variable frequency inverter system employing an open-ended, bidirectional shift register with associated logic to provide both initial loading and automatic self-correction.

It is a further object to provide a variable frequency inverter system employing an open-ended, bidirectional shift register with associated logic to supply, during each cycle of the operation of this system, a new pattern for the initiation of gating pulses to perpetuate a correct firing sequence and achieve self-correction.

The foregoing and other objects are achieved in accordance with the present invention by providing a polyphase inverter system employing conduction controlled devices which are rendered conductive in response to gating signals applied thereto. The system further includes means to generate a train of shift pulses at a frequency proportional to the desired operational frequency of the inverter system and a shift register for receiving those pulses. The shift register is comprised of a plurality of bit positions at least one of which corresponds to each of the conduction controlled devices and has its contents shifted in accordance with the application of the shift pulses in a direction determined by a direction signal. The gating signals are generated as a function of the instantaneous state of the shift register contents. The system of the present invention further includes logic means responsive to a prescribed instantaneous content of the register to generate a prescribed bit count for placement in the register at a location which is the function of the direction signal.

BRIEF DESCRIPTION OF THE DRAWING

While the present invention is particularly defined in the claims annexed to and forming a part of this specification, a better understanding can be had from the following description taken in conjunction with the accompanying drawing in which:

FIG. 4 is a table demonstrating a typical gate signal generation pattern in accordance with the prior art and FIG. 2; and, FIG. 5 is a table demonstrating a typical gate signal generator pattern in accordance with the present invention.

DETAILED DESCRIPTION

Figure 1:
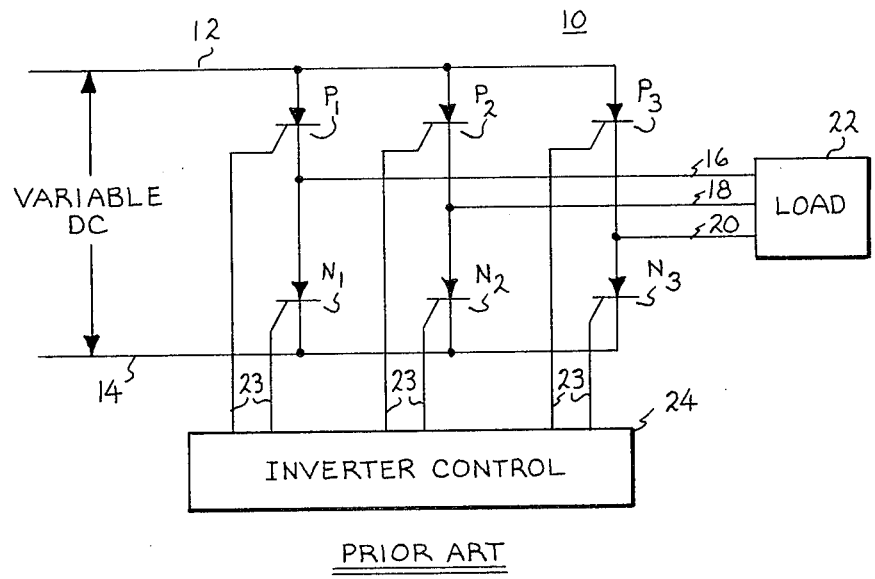
FIG. 1 is a schematic drawing of a basic inverter system as known in the art and such as is preferably used in the present invention.

Reference is now made to FIG. 1 which shows, in basic schematic form, an inverter system such as is known in the prior art and such as is generally applicable to the present invention. In FIG. 1, only the basic conducting elements have been shown in relationship to the total system and such things as snubbing circuits, commutating circuits, etc. have been omitted since these do not play any part in the understanding of the present invention. As shown in FIG. 1, the system includes a three phase semiconductor bridge 10 which is comprised of three positive thyristors $P_1$, $P_2$ and $P_3$ and three negative thyristors $N_1$, $N_2$ and $N_3$. The bridge 10 is connected to a source of variable d.c. power by way of a pair of buses 12 and 14. The source can supply variable d.c. voltage and/or current in accordance with the nature of the actual operational status of the bridge 10. As well as being grouped as positive and negative thyristors, grouping may also be made according to phase. Line 16 is connected at the junction of the series connected thyristors $P_1$ and $N_1$ as a first phase input to a load 22 while thyristors $P_2$ and $N_2$ are connected by way of phase line 18 to the load. In a similar manner, the third leg of the bridge, comprising series connected thyristors $P_3$ and $N_3$, is connected by way of phase line 20 to the load. In the illustrated embodiment the thyristors are rendered conductive by the appropriate application thereto of gating signals on leads 23 connected to the gate electrodes of each of the thyristors. The actual gating signals are developed by an inverter control 24 the nature of which will be determined in accordance with the type and overall desired function of the inverter.

Figure 2:
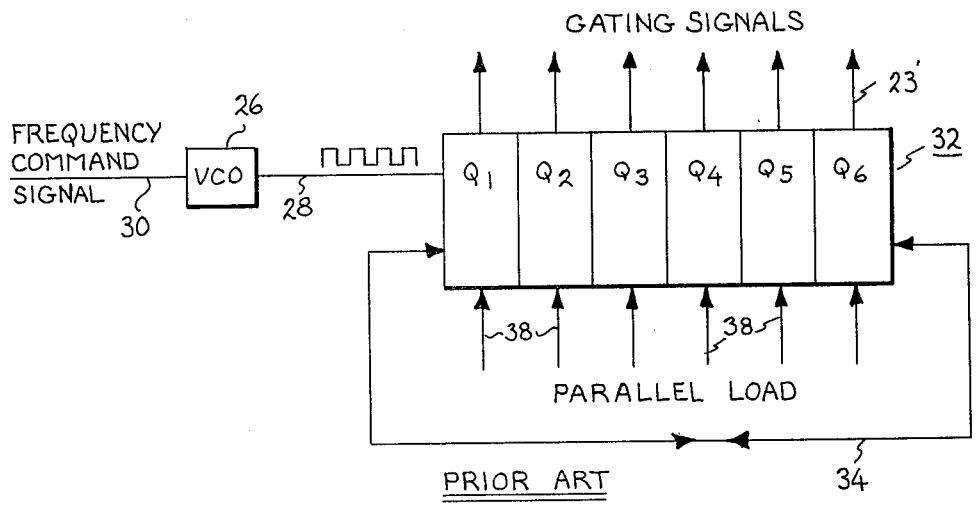
FIG. 2 is a schematic diagram showing the fundamentals of a control system such as might be used in an inverter system in accordance with the prior art.

FIG. 2 schematically illustrates, in fundamental form, one well-known version of control often used in systems like that depicted by FIG. 1. As shown in FIG. 2, a voltage controlled oscillator 26 provides as an output on line 28 a series of pulses having a frequency which is the function of an input command signal on line 30. In the typical embodiment, the command signal on line 30 is a d.c. voltage level and the voltage controlled oscillator develops output pulses as a function of the magnitude of that signal. The pulses on line 28 are applied as an input to a suitable bidirectional shift register shown generally at 32 which includes six bit positions $Q_1$ through $Q_6$. Shift register 32 may be of any suitable type well known in the art but normally would be comprised of series connected binary flip-flops such that a binary quantity placed in one of the flip-flops, for example, $Q_1$ is moved to $Q_2$ and thence to $Q_3$, etc. with each occurrence of a pulse on line 28. Lines 23', labeled "gating signals", sense the individual states of each of the bit positions $Q_1$ through $Q_6$ and serve to initiate the gating signals for application to the individual thyristors of the bridge (FIG. 1). In the typical system, the gating signals via lines 23' would not be applied directly to the thyristors of the bridge but would serve to operate gate drivers which serve to apply the actual gating signals. This, however, is well known in the art and further explanation is believed unnecessary. Further illustrated in FIG. 2 is a line 34 which connects the bit positions $Q_1$ and $Q_6$. This line, as indicated by the arrows, shows register 32 to be of a recirculating type and of a bidirectional nature. That is, a particular bit shifted out of location $Q_6$ will, if the register is operating in which is arbitrarily termed the forward direction, be put into the $Q_1$ position. Conversely, if the bridge is working in the reverse direction, the status of bit position $Q_1$ will, upon the occurrence of a pulse on line 28, be shifted from that bit position into bit position $Q_6$.

Lines 38, in FIG. 2, labeled "parallel load" represent the register loading scheme of this prior art configuration. In accordance with the most common prior art operation, when the inverter is first started, through suitable circuitry which has not been shown, binary 1's are placed into bit positions $Q_1$ and $Q_2$ while binary 0's are forced into the other four bit positions. Typically, bit position $Q_1$ would serve to initiate conduction of a one of the positive thyristors of the bridge, while bit position $Q_2$ would serve to initiate conduction of one of the negative thyristors of the bridge. Alternate bit positions would be respectively connected to positive and negative thyristors. FIG. 4 (Table 1) depicts a common prior art firing scheme by relating the Q register bit positions, $Q_1$ through $Q_6$, to the corresponding thyristor to which it is associated. It is obvious that other connection schemes will work so long as the basic pattern of not having the two thyristors at the same leg of the bridge conducting at the same time is observed. In the example being given, assuming that a positive sequence is being practiced, in accordance with Table 1 it is seen that with bit positions $Q_1$ and $Q_2$ having binary 1's, thyristors $P_1$ and $N_3$ would first fire. With the next occurrence of a pulse on line 28, the register contents will shift to the right and binary 1's would now exist in bit positions $Q_2$ and $Q_3$. The remaining positions will contain binary 0's. Thus, thyristor $N_3$ will remain conducting while thyristor $P_2$ will begin conduction and will commutate thyristor $P_1$. With the next pulse on line 28, the register contents will again shift and the two binary 1's would now be found in positions $Q_3$ and $Q_4$. This shifting continues with the occurrence of the pulses on line 28 with bits shifted out of $Q_6$ being placed in $Q_1$ by way of the recirculation path 34 (FIG. 2). In the negative sequence, the shifting is in the opposite direction.

This system works very satisfactorily so long as nothing occurs to disturb the bit pattern in the register. It is, however, very common for electrical noise to cause an extra bit to suddenly appear or disappear in the pattern. For example, looking to the original illustration, assume that binary 1's are placed in bit positions $Q_1$ and $Q_2$ and for some reason, such as noise, a binary 1 were to suddenly appear in bit position $Q_4$ as well. This extra "1" bit will cause erroneous action of the bridge resulting in shoot-throughs, improper conduction and irratic operation. Of course, the extra bit could be generated at any time during operation and it is also possible that a 1 bit may be erroneously changed to a "0". Because the pattern once established is recirculated, when this occurs the only solution is to shut down the system and to reinitiate operation with a reloading and a restarting of the inverter. This, obviously, is an undesirable situation in that the practice of shutting down an inverter and restarting is not one which is well received in many instances.

Figure 3:
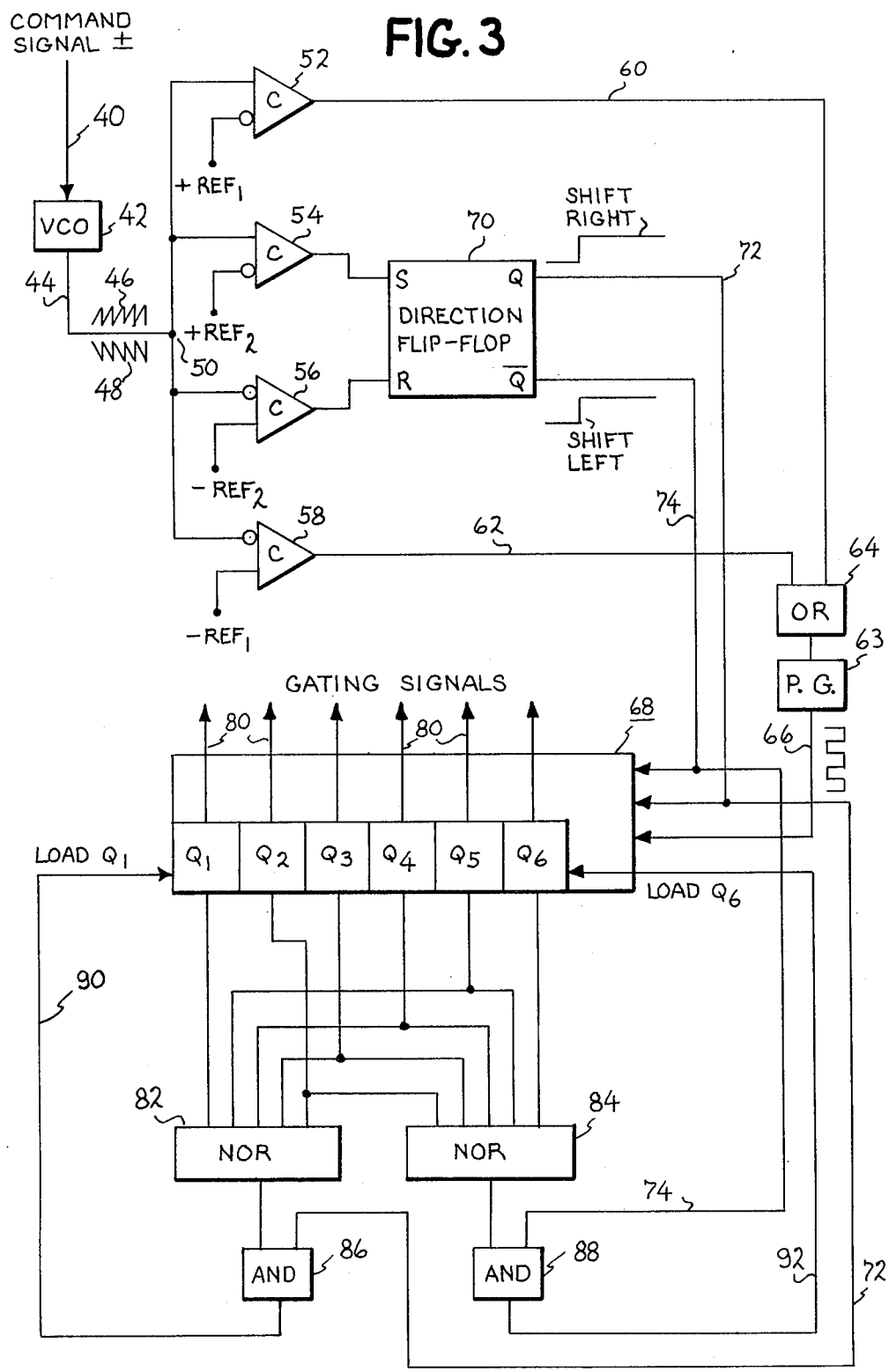
FIG. 3 is a schematic diagram of the gating control for use with the inverter system and in accordance with the preferred embodiment of the present invention.

The present invention alleviates this serious drawback of the prior art and is depicted in FIG. 3 which shows the control portion of the inverter system in accordance with the preferred embodiment of the present invention. Referencing now FIG. 3, it is seen that a plus or minus command signal is provided by way of line 40 to a voltage controlled oscillator 42. Oscillator 42, in this embodiment, is of the integrating type such that with the application of a positive command signal indicating a desired operation in the first direction, the oscillator 42 will output a positive signal on line 44 as shown at 46. Conversely, when a negative signal indicating a desired operation in the other direction is applied to the oscillator 42, the output on line 44 is a series of negative saw-tooth pulses as shown at 48. The amplitude of the pulses 46 and 48 will be governed by the overall voltage controlled oscillator circuitry while the frequency thereof, determined by the rate of integration in the case of an integrating oscillator, is a function of the absolute magnitude of the value of the signal applied thereto. The saw-tooth wave shape appearing on line 44 as seen at junction 50 serves as an input to four comparators 52, 54, 56 and 58. Comparators 52 and 58 serve to generate a train of pulses which occur at a frequency corresponding to the output of the oscillator 42 regardless of the polarity of the command signal. Thus, comparator 52 has its noninverting input connected to junction 50 while its inverting input is connected to a source of positive potential (+REF$_1$) which has a value corresponding to the peak value of the positive saw-tooth wave 46. In a similar manner, comparator 58 has its inverting input connected to junction 50 and its noninverting input connected to a negative reference potential (−REF$_1$) such that it responds to negative saw-tooth waves (see wave shape 48) appearing in junction 50. The output of comparator 52 on line 60 and the output of comparator 58 on line 62 are both applied to an OR gate 64 the output of which is supplied to a suitable pulse generator 63 (for example a monostable multivibrator or one-shot) such that there appears at the output of the pulse generator on line 66 a series of pulses regardless of whether the oscillator 42 is integrating in the positive or the negative direction. These pulses on line 66 are applied as a first input to the shift register 68 employed in the present invention which will be discussed in greater detail later.

The second pair of comparators, 54 and 56, may be considered direction comparators and also have applied thereto the signal which appears at junction 50. In the case of comparator 54, the signal is applied by way of a noninverting input while comparator 56 has a signal from junction 50 applied by way of its inverting input. The inverting input of comparator 54 is connected to a second positive potential (+REF$_2$) while the noninverting input of comparator 56 is connected to a second negative reference potential (−REF$_2$). By making the absolute magnitudes of the +REF$_2$ and −REF$_2$ signals slightly less than those of +REF$_1$ and −REF$_1$, it is seen that each of the comparators 54 and 56 will provide an output, respectively, for positive and negative command signals at a time sooner than the comparators 52 and 58, the amount of time being dependent upon the differential between the respective reference values. The signals from the two comparators 54 and 56 are applied to a direction flip-flop 70 with the set terminal of the flip-flop 70 receiving an input from comparator 54 and reset terminal receiving an input from comparator 56. Direction flip-flop 70 serves to provide a pair of steering or direction signals at its output which are designated as a shift right signal (Q output, line 72) and a shift left signal ($\overline{Q}$ output, line 74). The two shift signals also form inputs to the shift register 68. The description of FIG. 3 thus far forms the essence of the invention which is claimed in allowed U.S. Patent application Ser. No. 032,853, "Reversible Inverter System Having Improved Control Scheme" by the present inventors, which application was filed on even date herewith and which is assigned to the assignee of the present invention. For a more complete description of that invention and of the circuitry just described, reference is made to that application which is specifically incorporated hereinto by reference. It is seen from the description thus far that the signals appearing on line 66 will cause a shifting of the register 68 contents in a direction determined by the signals on lines 72 and 74. Thus, when the shift right signal is at a high level and a signal appears on line 72, the register contents will shift right at a rate governed by the rate of the pulses on line 66. In a similar manner, when the shift left signal on line 74 is high, the shifting will be to the left as shown in FIG. 3.

Shift register 68, as was the prior art case, has six bit positions, again designated $Q_1$ through $Q_6$, and, as was the prior art situation, may be comprised of serially connected flip-flops as is well known in the art. Similarly to that earlier described, lines 80 serve to provide gating signals to initiate conduction of the bridge thyristors (FIG. 1) as a function of the instantaneous contents of the $Q_1$–$Q_6$ bit positions of register 68; e.g., through suitable gate driver circuits. From viewing FIG. 3, it is seen that shift register 68 is not a recirculating shift register but is, in fact, open-ended. That is, even though bits are shifted from position to position, when they reach an end bit position, $Q_1$ or $Q_6$, further shifting results in the loss of that bit of information. The fact that bits are lost as they are shifted out of an end position is an important feature as will be explained in greater depth later with respect to the special load feature of the present invention. Bit positions $Q_1$ through $Q_5$ serve as inputs to a first NOR function logic gate 82 while bit positions $Q_2$ through $Q_6$ act as inputs to a NOR function logic gate 84. The output of NOR gate 82 is applied as one input to an AND gate 86, the other input of which is the shift right signal, line 72. In a similar manner, the output of NOR gate 84 serves as one input to a second AND gate 88, the second input to which is the shift left signal, line 74. The output of AND gate 86 on line 90, designated "load $Q_1$", is connected as an input to the $Q_1$ bit position while the output of AND gate 88, line 92, is connected to bit position $Q_6$ and is designated "load $Q_6$". In operation, in accordance with the type of logic illustrated, when binary 0's appear in bit positions $Q_1$ through $Q_5$, NOR gate 82 is enabled and if the shift right signal from direction flip-flop 70 is present (a binary 1), AND gate 86 will be enabled and a binary 1 will be loaded into bit position $Q_1$ to be subsequently shifted to the right through the register in accordance with the occurrence of the pulses on line 66. In a similar manner, if binary 0's appear in bit positions $Q_2$ through $Q_6$, NOR gate 84 will be enabled and if there exists at the same time a shift left signal by way of line 74, AND gate 88 will be enabled to load a binary 1 into bit position $Q_6$ to be subsequently shifted to the left. Thus, under normal operating circumstances, only one bit register will hold a binary 1 at any instant in time with all other bit positions being a binary 0.

One particular feature to be noted about the shift register 68 and the operation of the present invention is that if for any reason an erroneous signal is placed into the register, the present invention will make correction for this. That is, because the bits are not recirculated, the register being open-ended, an erroneous designation; e.g., an extra binary 1, which occurs during a cycle of operation will be shifted out of the end of the register and a new cycle with proper thyristor firing designation will automatically begin. Thus, while an error may be retained for part of the cycle, it does not continue to be present and thus the inverter need not be shut down since erroneous actions of this nature are normally easily handled by other features of the inverter or occur for such short period of time as to not be critical. In addition, it is seen that a sudden reversal of the sense of rotation at any time merely results in a reversal of the progression of the binary 1 through the register. It is further noted that no additional initial loading circuitry such as the parallel feature of the prior art is required since at the initiation of operation the system of the present invention will automatically effect the loading of the register. Assuming all binary 0's appear in the register 68 at the time of operation initiation, this condition can only exist for a very short time since upon the occurrence of the first shifting pulse (line 66) either position $Q_1$ or position $Q_6$, depending upon which direction signal is at a high level, will receive a binary 1 and operation will then commence as earlier described.

The use of the gating on lines 80 is somewhat different with respect to the present invention than in the prior art. Whereas in the prior art each register bit position was associated with a single particular thyristor of the bridge, in the case of the present invention each bit is connected to provide gating signals to a pair, one positive and one negative, of thyristors of the bridge. This relationship is shown by Table 2 of FIG. 5. In FIG. 5, which lists a typical sequence, it is seen that bit position $Q_1$ serves to initiate gating signals for thyristors $P_1$ and $N_2$. Bit position $Q_2$ serves to gate thyristors $P_1$ and $N_3$, etc. Thus, assuming a positive sequence of operation, it is seen that there is an orderly progression of firing of thyristors down through the bridge such that there is alternately positive and negative thyristors rendered conductive to perform operation of the bridge in essentially the same manner as was provided with respect to the prior art. As indicated in FIG. 5, a negative sequence progresses through the firing table in the opposite direction and results from a left to right shifting in the register 68.

Thus, it is seen that there has been provided an inverter system which is relatively simple and which provides for self-correction of the operational firing of the thyristors of the bridge, without regard to direction of rotation or sequence.

While there has been shown and described what is at present considered to be the preferred embodiment of the present invention, modifications thereto will readily occur to those skilled in the art. As an example, other forms of supplying the shift timing pulses and the direction signals could be employed. It is not desired, therefore, that the invention be limited to the specific arrangements shown and described and it is intended to cover in the appended claims all such modifications as fall within the true spirit and scope of the invention.

What is claimed is:

1. In a polyphase inverter system for converting direct current electrical power to alternating current electrical power through the use of conduction controlled devices selectively rendered operable in response to gating signals applied thereto, the improvement comprising:
   (a) pulse generator means for producing a train of pulses at a frequency proportional to the desired operational frequency of said inverter system;
   (b) a nonrecirculating shift register having a plurality of bit positions, said shift register providing output signals serving to initiate said gating signals in accordance with the instantaneous states of each of the bit positions of said shift register, said shift register being responsive to said train of pulses to shift the contents thereof; and,
   (c) logic means responsive to a prescribed bit configuration extant in a portion of said shift register for placing a predetermined bit designation in a designated position of said shift register for subsequent shifting in accordance with the occurrence of said train of pulses.

2. The invention in accordance with claim 1 wherein said pulse generating means is a voltage controlled oscillator.

3. The invention in accordance with claim 1 wherein said logic means includes gating means responsive to all except an end position bit.

4. The invention in accordance with claim 1 wherein said logic means includes a NOR gate responsive to all except an end position bit.

5. The invention in accordance with claim 1 wherein said shift register is bidirectional and further including means to develop a direction signal for application to said shift register to determine the direction of shifting therein.

6. Apparatus for generating gating signals to control the conduction initiation of conduction controlled devices forming power conversion arrangement for the conversion of electrical power from direct current to alternating current comprising:
   (a) means to provide a train of pulses proportional to the desired output frequency of the power conversion bridge;
   (b) a bidirectional, nonrecirculating shift register having a plurality of positions, said shift register providing output signals serving to initiate said gating signals in accordance with the instantaneous status of each of said bit positions;
   (c) means to generate a direction signal signifying a direction in which the contents of said shift register are to be shifted;
   (d) means to apply said train of pulses and said direction signal to said shift register whereby the contents of said shift register are shifted in the direction specified by said direction signal and at a rate in accordance with said train of pulses; and,
   (e) logic means responsive to the instantaneous contents of said register and said direction signal to place a prescribed bit designation in an end bit position of said register.

7. The invention in accordance with claim 6 for application to a three phase bridge having a pair of controlled rectifiers associated with each phase in which said register is an open-ended register having six bit positions.

8. The invention in accordance with claim 6 wherein said pulse generating means is a voltage controlled oscillator.

9. The invention in accordance with claim 6 wherein said logic means includes gating means responsive to all except an end position bit.

10. The invention in accordance with claim 6 wherein said logic means includes a NOR gate responsive to all except an end position bit.

11. A polyphase inverter for supplying variable frequency a.c. power to a load comprising:
   (a) a power conversion bridge having a pair of conduction controlled devices associated with each output phase of said bridge; and,
   (b) control means for developing gating signals for selectively rendering said devices conductive in a prescribed sequence, said control means comprising,
      (1) a nonrecirculating shift register having a plurality of bit positions corresponding in number to the number of controlled devices of said bridge, said shift register providing output signals in accordance with the instantaneous contents thereof, said output signals acting to initiate said gating signals,
      (2) a source of pulses having a frequency proportional to the desired operating frequency of said bridge for application to said shift register to cause the contents thereof to shift in accordance with the occurrence of said pulses, and, (3) logic means responsive to the instantaneous contents of said shift register and said direction signal for placing a predetermined bit pattern in said register for subsequent shifting in accordance with the occurrence of said pulses.

12. The invention in accordance with claim 11 wherein said shift register is bidirectional and responsive to a direction signal applied thereto and further including means to develop said direction signal whereby the contents of said register are shifted in the direction designated by said direction signal.

13. The invention in accordance with claim 11 wherein said logic means includes gating means responsive to all except an end position bit.

14. The invention in accordance with claim 11 wherein said logic means includes a NOR gate responsive to all except an end position bit.

15. The invention in accordance with claim 11 wherein the conduction controlled devices of said bridge are controlled rectifiers.

* * * * *